United States Patent
Jones, Jr.

(10) Patent No.: US 7,367,287 B1
(45) Date of Patent: May 6, 2008

(54) ANIMAL CONTROL APPARATUS

(76) Inventor: Roy Wayne Jones, Jr., P.O. Box 53, Tipton, TN (US) 38071

(*) Notice: Subject to any disclaimer, the term of this patent is extended or adjusted under 35 U.S.C. 154(b) by 26 days.

(21) Appl. No.: 11/418,238

(22) Filed: May 5, 2006

(51) Int. Cl.
*A01K 27/00* (2006.01)
(52) U.S. Cl. .................................. 119/798
(58) Field of Classification Search ........... 119/772, 119/774, 776–779
See application file for complete search history.

(56) References Cited

U.S. PATENT DOCUMENTS

| | | | | |
|---|---|---|---|---|
| 544,568 | A | * | 8/1895 | Desailly et al. ............ 119/523 |
| 579,113 | A | * | 3/1897 | Lally .......................... 119/776 |
| 703,713 | A | * | 7/1902 | Smith et al. ................ 267/70 |
| 3,867,905 | A | | 2/1975 | Vail, Jr. |
| 4,391,226 | A | | 7/1983 | Guthrie |
| 4,530,310 | A | * | 7/1985 | Clarke ........................ 119/776 |
| 5,125,365 | A | | 6/1992 | Bonilla |
| RE34,351 | E | * | 8/1993 | Lacey ......................... 119/776 |
| D374,518 | S | | 10/1996 | McIntyre |
| 5,706,764 | A | | 1/1998 | Irbinskas |

FOREIGN PATENT DOCUMENTS

DE 3408671 A1 * 3/1984

* cited by examiner

Primary Examiner—Thomas Price
(74) Attorney, Agent, or Firm—Crossley Patent Law; Mark Ashley Crossley

(57) ABSTRACT

The animal control apparatus has a hollow cylindrical tube with a first and second end. A handle is attached to the first tube end. A cable within the tube has a first end with a cable movement member. The spring has a first and second end, and a spring stop and a spring compression plate are formed in the tube. There is a top end cap and a bottom end cap. The bottom end cap has a first and second pivot point, a first and a second clasp arms are attached to the first and second pivot points. The clasp arm movement means is attached to the cable second end and interacts with the first and second clasp arms to open and close the arms. The clasp arm movement means can be t-shaped, and have a central arm attached to the cable and a pair of opposed engagement arms, with pins that extend outwardly from the engagement arms and engage slots in the clasp arms.

8 Claims, 4 Drawing Sheets

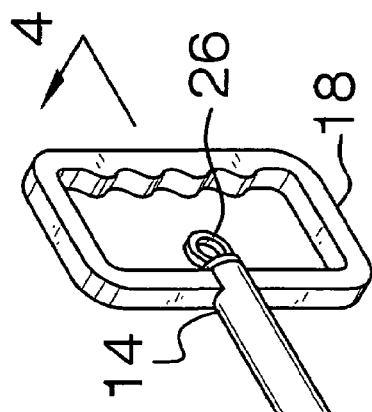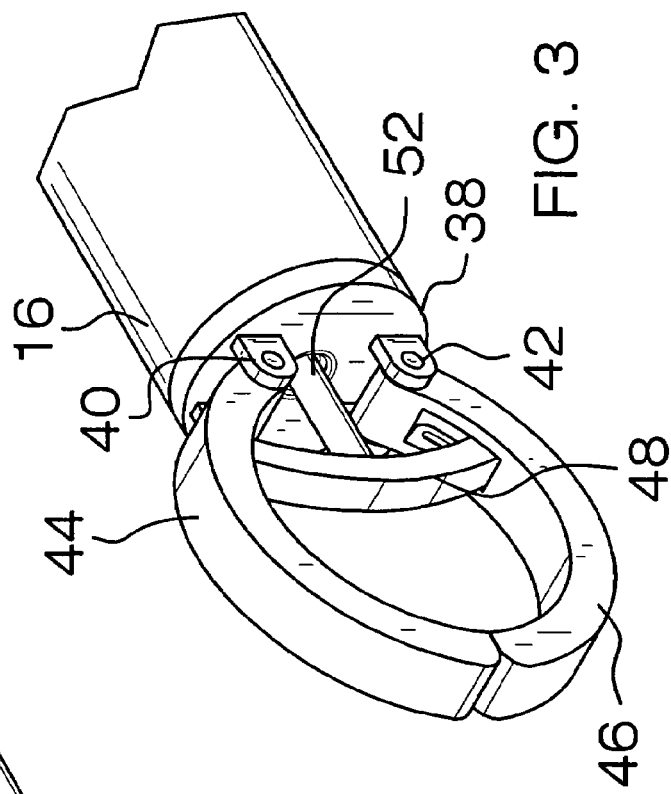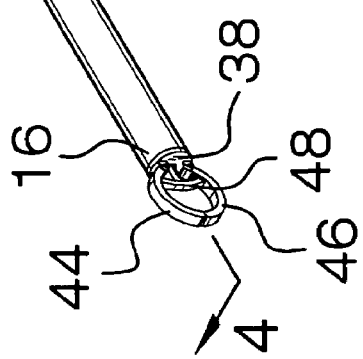

ANIMAL CONTROL APPARATUS

BACKGROUND OF THE INVENTION

Many offerings exist by which an individual can control animals while exercising or walking them. The devices offered, however, do not solve all problems associated with quick collar release and increased control of the animal. When a flexible leash is used, the animal can move as desired, and no leverage can be exerted on the animal, through the leash, as is possible with a rigid leash.

FIELD OF THE INVENTION

The present invention relates to an animal control apparatus for use in connection with controlling an animal. The animal control apparatus has particular utility in connection with controlling the animal effectively, as well as being able to quickly attach to or release from, the collar of the animal.

DESCRIPTION OF THE PRIOR ART

The use of animal control devices is known in the prior art. For example, U.S. Pat. No. 4,530,310 to Clarke discloses a dog leash assembly. However, the Clarke '310 patent does not provide the stability of the present device, and has further drawbacks of requiring the use of both hands to secure or release the dog.

U.S. Pat. No. 5,123,365 to Bonilla discloses a release dog apparatus that opens to engage the dog's leash. However, the Bonilla '365 patent does not provide a rigid lead, and additionally does not provide the ability to gain control of the animal without the need to place one's hands near the dog.

While the above-described devices fulfill their respective and particular objects and requirements, they do not describe an animal control apparatus that provides for the advantages of the present invention; therefore, a need exists for an improved animal control apparatus, particularly one that includes a rigid attachment to leverage the dog and the ability to remotely gain control of and release the animal.

In this respect, the present invention substantially departs from the conventional concepts and designs of the prior art.

SUMMARY OF THE INVENTION

In view of the foregoing disadvantages inherent in the known types of animal control devices now present in the prior art, the present invention provides an improved animal control apparatus, and overcomes the above-mentioned disadvantages and drawbacks of the prior art. As such, the general purpose of the present invention, which will be described subsequently in greater detail, is to provide a new and improved animal control apparatus which has all the advantages of the prior art mentioned heretofore and many novel features that result in a animal control apparatus which is not anticipated, rendered obvious, suggested, or even implied by the prior art, either alone or in any combination thereof.

To attain this, the present invention essentially comprises a hollow cylindrical tube that has a first end and a second opposite end. There is a handle attached to the first tube end, to allow for better control of the animal through the use of the leverage a handle affords. There is a cable inside the tube that has a first end and a second opposite end. The cable activates the clasp arms to grip the dog or other animal's collar. There is a cable movement member attached to the cable first end, usually this would be a small ring that the user can pull with his finger, although a T-bar would also allow for quick targeting of the cable movement member for easy release or engagement of the animal. The cable runs through a spring that has a first end and a second opposite end. There is a spring stop at the spring first end to keep the spring retained in the tube and a spring compression plate at the spring second end to keep the spring from dropping out of the bottom of the tube. The tube has a top end cap and a bottom end cap. The bottom end cap has a first pivot point and a second pivot point, and there is a first clasp arm attached to the first pivot point and a second clasp arm attached to the second pivot point.

There can also be a clasp arm movement means attached to the cable second end and connecting to the first clasp arm and second clasp arm. The handle can be a rounded edge rectangular shape, a circular shape or an oval shape. The clasp arm movement means can be t-shaped, having a central arm attached to the cable second end and a pair of opposed engagement arms.

There has thus been outlined, rather broadly, the more important features of the invention in order that the detailed description thereof that follows may be better understood and in order that the present contribution to the art may be better appreciated.

The invention may also have pins as the interaction members that would extend outwardly from the first and second clasp arms, and fit into matching slots on the clasp arms. There are, of course, additional features of the invention that will be described hereinafter and which will form the subject matter of the claims attached.

It is therefore an object of the present invention to provide a new and improved animal control apparatus that has all of the advantages of the prior art animal control devices and none of the disadvantages.

It is another object of the present invention to provide a new and improved animal control apparatus that may be easily and efficiently manufactured and marketed.

An even further object of the present invention is to provide a new and improved animal control apparatus that has a low cost of manufacture with regard to both materials and labor, and which accordingly is then susceptible of low prices of sale to the consuming public, thereby making such animal control apparatus economically available to the buying public.

Still another object of the present invention is to provide a new animal control apparatus that provides in the apparatuses and methods of the prior art some of the advantages thereof, while simultaneously overcoming some of the disadvantages normally associated therewith.

Even still another object of the present invention is to provide an animal control apparatus for improved control of the animal. This allows the user to leverage his weight against the weight of the animal more effectively.

Still yet another object of the present invention is to provide an animal control apparatus for rapid securing and release of the animal. This makes it possible to quickly control and then release engagement the animal when the need for control is over.

A further object of the present invention is to provide an animal control apparatus that provides for control and release of an animal without the need to place the user's hands near the mouth of the animal, which can increase the safety and comfort of the user.

Thus has been broadly outlined the more important features of the animal control apparatus so that the detailed description thereof that follows may be better understood and in order that the present contribution to the art may be better appreciated.

Numerous objects, features and advantages of the animal control apparatus will be readily apparent to those of ordinary skill in the art upon reading the following detailed description of presently preferred, but nonetheless illustrative, embodiments of the animal control apparatus when taken in conjunction with the accompanying drawings. In this respect, before explaining the current embodiments of the animal control apparatus in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the animal control apparatus. It is therefore important that the claims be regarded as including such equivalent constructions insofar as they do not depart from the spirit and scope of the present invention.

These together with additional objects of the animal control apparatus, along with various novel features that characterize the invention are particularly pointed out in the claims forming a part of this disclosure. For better understanding of the animal control apparatus, its operating advantages and specific objects attained by its uses, refer to the accompanying drawings and description.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a perspective view of the animal control apparatus.

FIG. 3 is a close-up perspective view of the clasp and associated mechanism of the animal control apparatus.

The same reference numbers refer to the same parts throughout the various figures.

DETAILED DESCRIPTION OF THE PREFERRED EMBODIMENT

Figure 1:
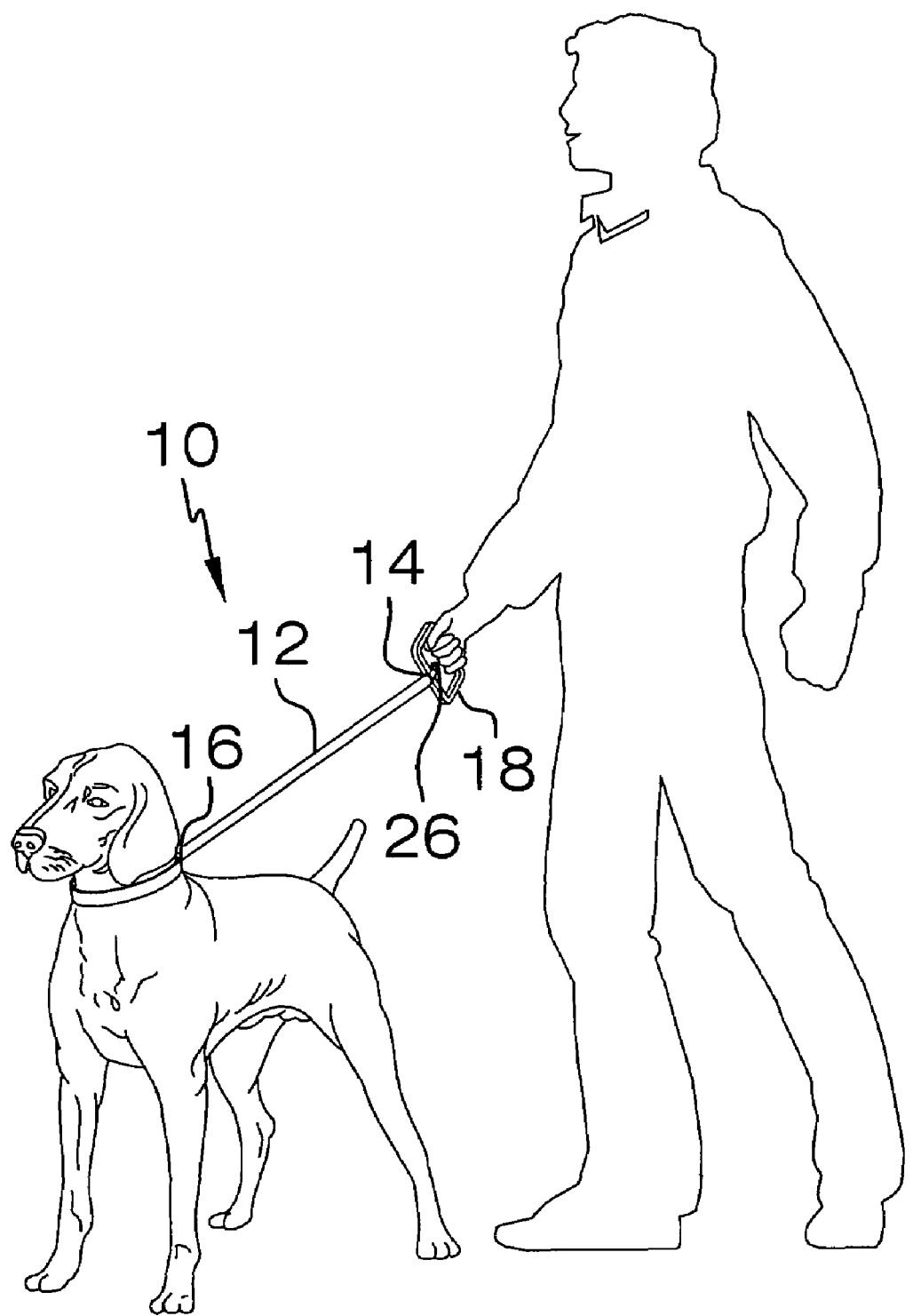
FIG. 1 is an in use perspective view of the preferred embodiment of the animal control apparatus constructed in accordance with the principles of the present invention.

Referring now to the drawings, a preferred embodiment of the animal control apparatus of the present invention is shown and generally designated by the reference numeral 10.

In FIG. 1, a new and improved animal control apparatus 10 of the present invention for easily controlling an animal is illustrated and will be described. More particularly, the animal control apparatus 10 has a hollow cylindrical tube 12 having a first end 14 and a second end 16. There is a handle 18 attached to the first tube end 14. The animal control apparatus is shown in use controlling a dog. The cable movement member 26 attached to the cable first end 22 can be seen as a ring within the handle 18. The user would simply pull the cable movement member 26 to release the dog.

FIG. 2 is a perspective view of the animal control apparatus. The hollow cylindrical tube 12 has a first end 14 and a second 16 end. The handle 18 is attached to the first tube end 14. The cable movement member 26 is attached to the cable first end 22, which is not seen, and the clasp arm movement means 48 is attached to the cable second end 24, which is also not seen. The bottom end cap 38 has a first pivot point 40 and a second pivot point 42. There is a first clasp arm 44 attached to the first pivot point 40 and a second clasp arm 46 attached to the second pivot point 42.

FIG. 3 is a close-up perspective view of the clasp arms 44 and 46 and associated mechanism of the animal control apparatus. The first pivot point 40 and second pivot point 42 are on the bottom end cap 38. The first clasp arm 44 is attached to the first pivot point 40 and the second clasp arm 46 is attached to the second pivot point 42. The clasp arm movement means 48 is t-shaped and has a central arm 52 attached to the cable second end 24 and a pair of opposed engagement arms 54a and 54b. The engagement arms 54a and 54b have interaction members 56a and 56b, and the first clasp arm 44 and second clasp arm 46 have corresponding interaction slots 58a and 58b. The interaction members 56a and 56b can be pins 60, that extend outwardly from the engagement arms 54a and 54b.

Figure 4:
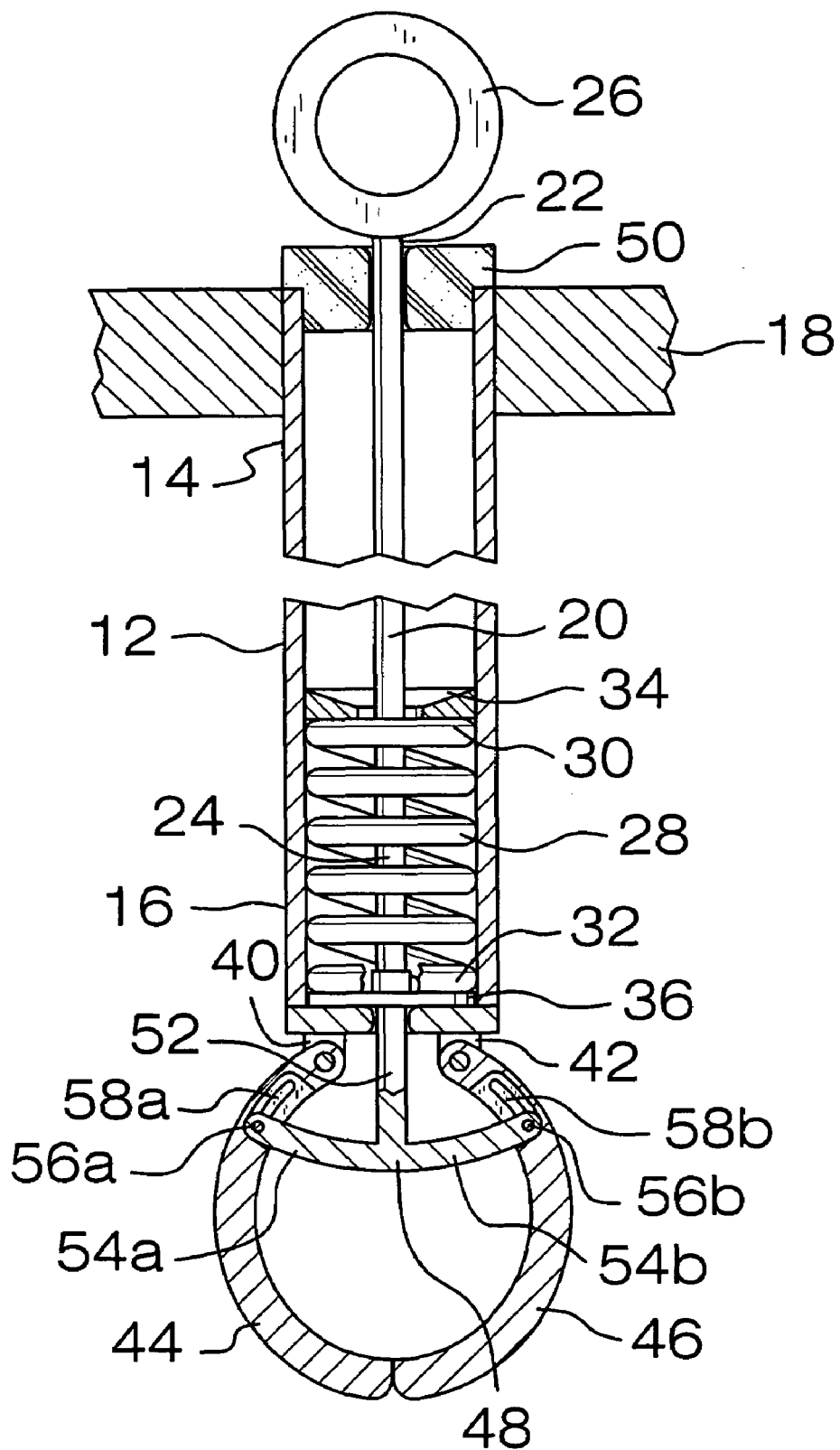
FIG. 4 is a cross sectional view of the animal control apparatus, taken essentially along the lines 4-4 of FIG. 2.

FIG. 4 is a cross sectional view of the animal control apparatus, taken essentially along the lines 4-4 of FIG. 2. The hollow cylindrical tube 12 has a first end 14 and a second end 16. The handle 18 is attached to the first tube end 14. The cable movement member 26 is attached to the cable first end 22 and the clasp arm movement means 48 is attached to the cable second end 24. The spring 28 has a spring first end 30 and a spring second 32 end. A spring stop 34 at the spring first end 30 and a spring compression plate 36 at the spring second end 32 functions to contain the spring within the tube 12. There is a bottom end cap 38 that has a first pivot point 40 and a second pivot point 42. The first clasp arm 44 is attached to the first pivot point 40 and the second clasp arm 46 is attached to the second pivot point 42. The tube has a top end cap 50. The clasp arm movement means 48 is t-shaped and has a central arm 52 attached to the cable second end 24 and a pair of opposed engagement arms 54a and 54b. The engagement arms 54a and 54b have interaction members 56a and 56b the first clasp arm 44 and second clasp arm 46 have corresponding interaction slots 58a and 58b.

Figure 5:
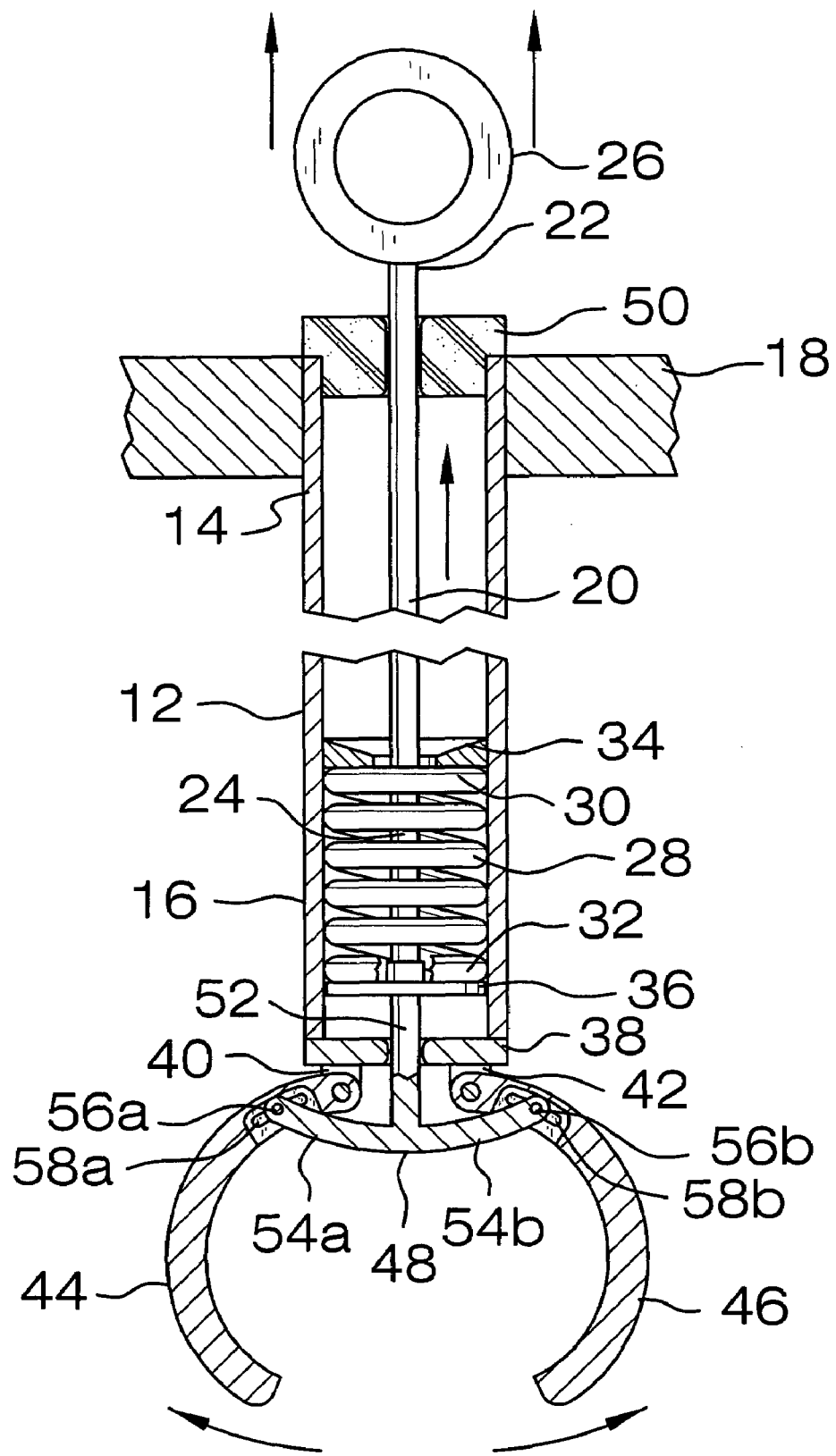
FIG. 5 is a cross sectional view of the animal control apparatus, taken essentially along the lines 4-4 of FIG. 2 showing the clasp opened, and the arrows designating the relative movement of each part of the device.

FIG. 5 is a cross sectional view of the animal control apparatus, taken essentially along the lines 5-5 of FIG. 2 and showing the clasp opened. The arrows designate the relative movement of each part of the device. The hollow cylindrical tube 12 has a first end 14 and a second 16 end. The handle 18 is attached to the first tube end 14. The spring 28 has a spring first end 30 and a spring second 32 end. A spring stop 34 at the spring first end 30 and a spring compression plate 36 at the spring second end 32 functions to contain the spring within the tube 12, and to utilize the compressive energy of the spring 28. The spring 28 is compressed when the cable movement member 26 is moved in the direction indicated by the arrow. The cable movement member 26 is attached to the cable first end 22 and the clasp arm movement means 48 is attached to the cable second end 24. There is a bottom end cap 38 that has a first pivot point 40 and a second pivot point 42. The first clasp arm 44 is attached to the first pivot point 40 and the second clasp arm 46 is attached to the second pivot point 42. The tube has a top end cap 50. The clasp arm movement means 48 can be t-shaped and have a central arm 52 attached to the cable second end 24 and a pair of opposed engagement arms 54a and 54b. The engagement arms 54a and 54b have interaction members 56a and 56b and the first clasp arm 44 and second clasp arm 46 have corresponding interaction slots 58a and 58b.

The invention is a hollow tube having first and second ends, and a handle is attached to the first tube end. A cable with a first end and a second end is located inside the tube. The cable goes through the open center area of a spring. The spring has a first and second opposite ends. A spring stop is at the spring first end and a spring compression plate is at the spring second end function to contain the spring within the tube and utilize the compressive force of the spring. The spring is compressed when the cable movement member attached to the cable first end is moved in the direction indicated by the arrow. The cable movement member is attached to the cable first end and the clasp arm movement means is attached to the cable second end. The clasp arm movement means is preferably t-shaped and has a central arm attached to the cable second end and a pair of opposed engagement arms. The pair of opposed engagement arms have interaction members, and the first and second clasp arms have corresponding interaction slots.

In use, it can now be understood that the user would hold the device by the handle and pull the cable movement member to open the clasp arms and either attach to or release the animal. The cable movement member would be pulled by the user, thereby moving the cable, and the spring would be compressed. When the cable movement member is released, the spring would return to the uncompressed state and close the clasp arms.

While a preferred embodiment of the animal control apparatus has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal or plastic may be used for construction of the animal control apparatus. The springs may also be made of heavy-duty metal or similar material. And although controlling of dogs has been described, it should be appreciated that the animal control apparatus herein described is also suitable for controlling a wide variety of animals. Furthermore, a wide variety of animals may be controlled instead of the described controlling of dogs.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An animal control apparatus comprising:
   a hollow cylindrical tube having a first and a second opposite ends;
   a handle attached to said first tube end;
   a cable within said tube having a first and a second opposite ends;
   a cable movement member attached to said cable first end;
   a spring having a first and a second opposite ends;
   a spring stop at said spring first end and a spring compression plate at said spring second end;
   a bottom end cap;
   a first pivot point and a second pivot point on said end cap;
   a first clasp arm attached to said first pivot point and a second clasp arm attached to said second pivot point;
   a clasp arm movement means attached to said cable second end and connecting to said first clasp arm and second clasp arm,
   wherein said tube has a top end cap,
   wherein said handle is a rounded edge rectangular shape,
   wherein said handle is a circular shape,
   wherein said clasp arm movement means is t-shaped, having a central arm attached to said cable second end and a pair of opposed engagement arms.

2. The animal control apparatus of claim 1 wherein said engagement arms have interaction members and said first and second clasp arms have corresponding interaction slots.

3. The animal control apparatus of claim 2 wherein said interaction members are pins that extend outwardly from said engagement arms.

4. The animal control apparatus comprising:
   a hollow cylindrical tube having a first and a second opposite ends;
   a handle attached to said first tube end;
   a cable within said tube having a first and a second opposite ends;
   a cable movement member attached to said cable first end;
   a spring having a first and a second opposite ends;
   a spring stop at said spring first end and a spring compression plate at said spring second end;
   a top end cap and a bottom end cap;
   a first pivot point and a second pivot point on said end cap;
   a first clasp arm attached to said first pivot point and a second clasp arm attached to said second pivot point;
   a clasp arm movement means attached to said cable second end and connecting to said first clasp arm and second clasp arm,
   wherein said handle is a circular shape,
   wherein said clasp arm movement means is t-shaped, having a central arm attached to said cable second end and a pair of opposed engagement arms.

5. The animal control apparatus of claim 4 wherein said engagement arms have interaction members and said first and second clasp arms have corresponding interaction slots.

6. The animal control apparatus of claim 5 wherein said interaction members are pins that extend outwardly from said engagement arms.

7. An animal control apparatus comprising:
   a hollow cylindrical tube having a first and a second opposite ends;
   a handle attached to said first tube end;
   a cable within said tube having a first and a second opposite ends;
   a cable movement member attached to said cable first end;

a spring having a first and a second opposite ends;
a spring stop at said spring first end and a spring compression plate at said spring second end;
a top end cap and a bottom end cap;
a first pivot point and a second pivot point on said end cap;
a first clasp arm attached to said first pivot point and a second clasp arm attached to said second pivot point;
a clasp arm movement means attached to said cable second end and connecting to said first clasp arm and second clasp arm,
wherein said handle is a rounded edge rectangular shape, a circular shape or an oval shape,
wherein said clasp arm movement means is t-shaped, having a central arm attached to said cable second end and a pair of opposed engagement arms.

8. The animal control apparatus of claim 7 wherein said clasp arm movement means is t-shaped, having a central arm attached to said cable second end and a pair of opposed engagement arms, wherein said interaction members are pins that extend outwardly from said engagement arms, and said first and second clasp arms have corresponding interaction slots.

* * * * *